United States Patent [19]

Dent et al.

[11] 4,106,659

[45] Aug. 15, 1978

[54] PRESSURE VESSEL

[75] Inventors: Richard G. Dent, Davison; Gary F. Stack, Holly, both of Mich.

[73] Assignee: General Motors Corporation, Detroit, Mich.

[21] Appl. No.: 701,527

[22] Filed: Jul. 1, 1976

[51] Int. Cl.² ..................... B65D 7/42; B65D 45/32
[52] U.S. Cl. ................................. 220/67; 220/319; 220/73
[58] Field of Search ............... 220/319, 81 R, 1 BC, 220/3, 67, 73, 75, 76, 79, 80, 77, 78, 309

[56] References Cited

U.S. PATENT DOCUMENTS

| | | | |
|---|---|---|---|
| 1,564,880 | 12/1925 | Mauser | 220/73 |
| 2,096,823 | 10/1937 | Penney | 220/309 X |
| 2,810,492 | 10/1957 | Bergen et al. | 220/67 X |
| 3,145,169 | 8/1964 | Baldwin et al. | 210/232 |
| 3,232,437 | 2/1966 | Hultgren | 210/440 |
| 3,955,705 | 5/1976 | Dubois et al. | 220/67 |

Primary Examiner—William Price
Assistant Examiner—Steven M. Pollard
Attorney, Agent, or Firm—Ronald L. Phillips

[57] ABSTRACT

A pressure vessel having a band compressed onto a lockseam to angle the latter under an end plate for increased seam strength.

2 Claims, 3 Drawing Figures

PRESSURE VESSEL

This invention relates to pressure vessels and more particularly to a reinforced lockseam arrangement for same.

In the prior art of pressure vessels such as oil filters, it is common practice to use a lockseam between the lid and canister. It has been found that the conventional lockseam while capable of meeting the pressures in the conventional automotive engine, generally lacks the strength for high pressure applications such as hydraulic transmissions and high performance engines where the pressures may be more than twice as high.

According to the present invention, a very simple improvement to the conventional lockseam substantially increases its strength to enable it to meet these much higher pressures without increasing the thickness of the lid and/or canister. This improvement is provided by the addition of a continuous annular band which is compressed on the lockseam so as to deflect it inward of the outer edge of a plate that is behind the lid and normally serves to mount the filter to the system. As a result, the forces tending to separate the lockseam must also bend the lockseam radially outward about the edge of the plate while the added band also helps to prevent the lockseam from unraveling.

An object of the present invention is to provide a pressure vessel having a new and improved lockseam arrangement.

Another object is to provide in a pressure vessel a lockseam arrangement wherein both bending and unraveling forces are required to separate the seam against an added unraveling force component on the seam.

Another object is to provide a pressure vessel having a compression band for preventing unraveling of a lockseam while also orienting the seam so that bending forces about the edge of a closure end plate and acting on the lockseam are also required to separate same.

These and other objects of the present invention will be more apparent from the following description and drawing in which.

Figure 1:
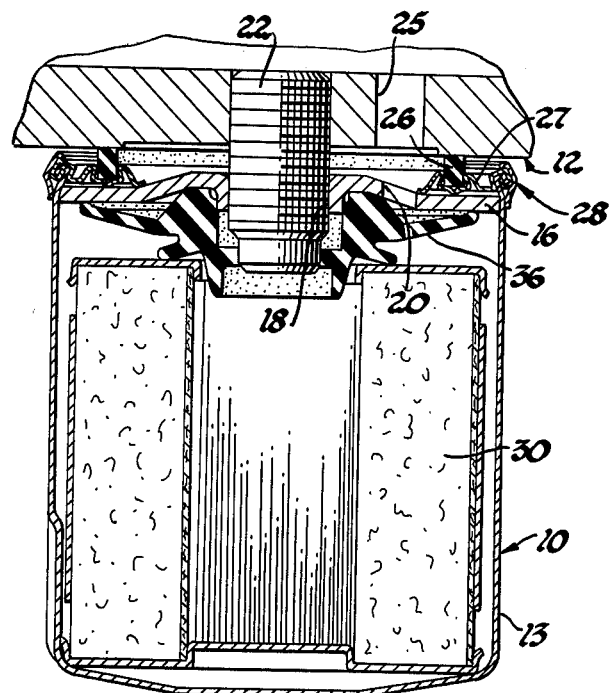
FIG. 1 is a longitudinal view with parts in section of a high pressure oil filter having a reinforced lockseam arrangement according to the present invention.

Referring to FIG. 1 there is shown a high pressure oil filter 10 embodying the present invention used for filtering the oil used in a high pressure oil system 12 such as a hydraulic transmission or a high performance engine. The filter comprises a cylindrical sheet-metal canister 13 which is closed at one end 14 and open at the other. The open end is closed by a steel closure or end plate 16 which also serves to mount the filter to the system as will be described in more detail later. The plate 16 has a central fluid outlet 18 and a plurality of fluid inlets 20 circularly arranged around the outlet. The outlet 18 is threaded to engage a return pipe 22 extending from the system 12 while the inlets 20 open to an unfiltered feed passage 25 in the system radially inwardly of a circular gasket 26. The gasket 26 is mounted on an annular sheet-metal lid 27 which is secured to the open end of the canister 13 by a lockseam arrangement generally designated as 28 which in turn holds the mounting plate 16 against outward movement, the details of the lockseam arrangement according to the present invention being described in detail later. A hollow cylindrical filter cartridge 30 is positioned in the canister with its outer sides spaced radially inward from the canister's cylindrical wall so that oil entering through the inlets 20 may flow to the outside of the cartridge and then radially inwardly therethrough to the hollow axially extending center and then to the return pipe 22.

To prevent oil from draining back out the inlets 20 there is provided an anti-drainback valve 36 of elastomeric material which is located between the filter cartridge 30 and the mounting plate 16. The valve 36 is like that disclosed in co-pending U.S. patent application Ser. No. 586,911 which is assigned to the assignee of this invention and is hereby incorporated by reference. The valve 36 deflects to permit oil to pass through the cartridge and back to the system and closes in the absence of pressure to prevent drainback. In addition, the valve 36 serves as a spring to hold the cartridge in position against the closed end of the canister while also providing sealing between the other end of the canister and the mounting plate 16 about and between the inlets 20 and outlet 18. For further details of the filter arrangement and the particular anti-drainback valve reference may be made to the afore-identified U.S. patent application Ser. No. 586,911.

Figure 2:
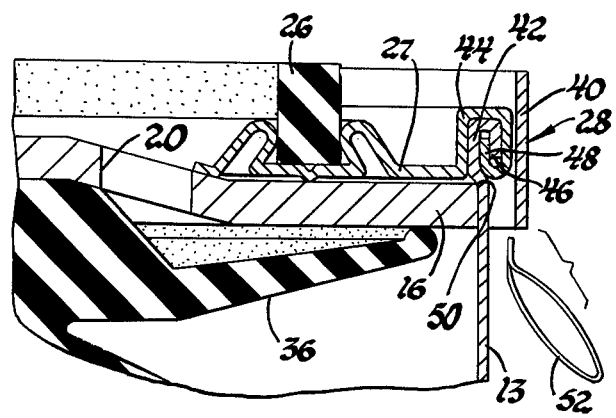
FIG. 2 is an enlarged view of a portion of FIG. 1 but with the filter disconnected from its environment and with the reinforcing band shown in position prior to compression onto the lockseam.

Typically, in such arrangements the folds in the lockseam 28 extend axially of the canister as shown in FIG. 2 and when the pressure limits of the vessel are exceeded the lockseam unfolds. In other words, the force necessary to unfold the lockseam determines the pressure limit of the filter. While such a lockseam is entirely satisfactory for automotive passenger car engine use, it has been found to lack sufficient strength to meet the much higher pressures experienced in certain systems such as hydraulic transmissions and some high performance engines. The obvious way to meet these high pressures is to increase the thickness of the sheet metal but this introduces a cost-benefit factor overshadowed by the fact that the seam is the weak link and increased thickness elsewhere in the canister and lid adds both a cost and weight burden.

According to the present invention the conventional lockseam arrangement 28 is simply and readily and relatively inexpensively reinforced by adding only a continuous sheetmetal compression-reinforcing band 40 that need be of no greater thickness than the canister and lid. As shown in FIG. 2, in the typical lockseam (prior to the addition of band 40) juxtaposed portions of the canister and lid are twice folded by well-known conventional methods such that their respective pleats 42 and 44 parallel the canister axis with their respective ends 46 and 48 located between the pleats and hooking each other to prevent separation of the canister and lid. In such an arrangement the lockseam overhangs the mounting plate 16 and the hooked ends are clamped by the pleats on the lid 27 but this has been found lacking in meeting very high pressures.

At the completion of the normal forming of the lockseam and in accordance with the present invention the sheetmetal band 40 which initially has a cylindrical shape is then located about the outermost axially extending lockseam pleat 44 with its opposite ends extending axially past those of the lockseam and with one end of the band also extending substantially the thickness of the mounting plate 16 as shown in FIG. 2. Next, the band 40 is compressed by a suitable collapsing process such as with the use of a magnetic force, a mechanical operation or a hydraulic or pneumatic operation. In this collapsing process the band 40 is compressed onto the canister radially outward of the rigid mounting plate 16 and then collapses about the overhanging lockseam forcing it to bend radially inwardly about the upper edge 50 of the mounting plate 16 forming a back angle at the inside edge of the lockseam. With the band 40 thus curled about the lockseam and the lockseam also bent radially inward at an angle of about 30° it has been found that the lockseam strength is increased about two-fold or more with the forces tending to unravel the lockseam now also being required to act through the rigid mounting plate to additionally provide a bending moment to force the lockseam back radially outward before a substantial unraveling can proceed. Thus, the added compression-reinforcing band 40 not only prohibits the unraveling or unrolling of the lockseam in the manner of the outer lockseam pleat, it also forces and holds the backward angle of the lockseam for increased lockseam strength.

Figure 3:
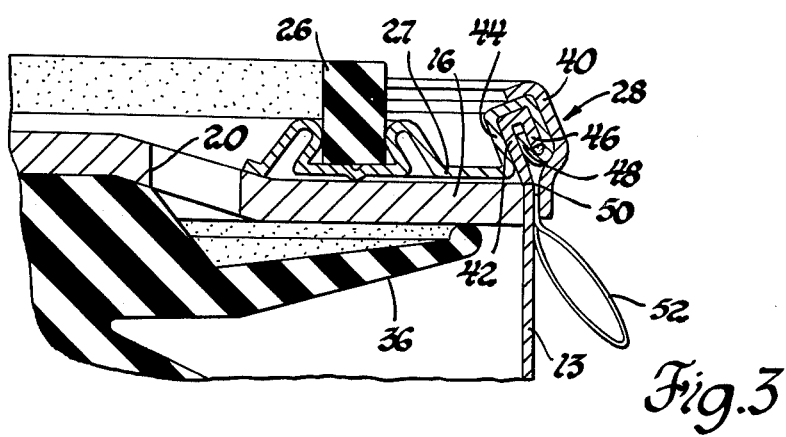
FIG. 3 is a view similar to FIG. 2 but with the reinforcing band finally assembled.

Furthermore, as shown in FIG. 3 the anchoring end of a retaining wire clip 52 may be positioned between the band 40 and the canister 13 radially outward of the mounting plate 16 prior to compression of the band so that the retaining wire clip is secured on collapse rather than having to be secured by other means such as welding to the canister. Alternatively, the band may be provided with one or more integral tabs which are pierced to receive a lock wire. This added feature available with the band saves both time and material, the wire clip or tabs being required for example for certain aircraft oil filter applications.

The above described embodiment is illustrative of the invention which may be modified within the scope of the appended claims.

We claim:

1. A pressure vessel comprising a sheet-metal canister having an open end, a rigid plate having an outer edge conforming to and fitting within said open end, a sheet-metal lid juxtaposed with an outer portion of said plate, said canister at said open end and an outer portion of said lid being folded together to form a lockseam having pleats extending longitudinally of said canister and overhanging said plate, and a continuous band fitting over said lockseam and also said plate and forcing said lockseam to be bent radially inward about said plate so that said pleats are oriented transversely of the canister whereby the forces acting to pull the lockseam apart must also bend said lockseam outward about said plate and against said band before the lockseam can unravel.

2. A pressure vessel comprising a sheet-metal cylindrical canister having an open end, a rigid plate having an outer radial edge conforming to and fitting within said open end, a sheet-metal lid juxtaposed with an outer radial portion of said plate, said canister at said open end and an outer radial portion of said lid being folded together to form a lockseam having pleats extending axially of said canister and overhanging an outer edge of said plate, and a continuous band fitting over said lockseam and also at least a substantial portion of the thickness of said plate and forcing said lockseam to be bent radially inward about the outer edge of said plate so that said pleats are oriented transversely of the canister whereby the forces acting to pull the lockseam apart must also bend said lockseam radially outward about said plate and against said band before the lockseam can unravel.

* * * * *